United States Patent
Ogawa et al.

(10) Patent No.: US 9,783,053 B2
(45) Date of Patent: Oct. 10, 2017

(54) CLUTCH CONTROL DEVICE FOR 4-WHEEL DRIVE VEHICLE

(71) Applicant: Nissan Motor Co., Ltd., Yokohama-shi, Kanagawa (JP)

(72) Inventors: Katsuyoshi Ogawa, Kanagawa (JP); Atsuhiro Mori, Kanagawa (JP); Shunichi Mitsuishi, Kanagawa (JP); Makoto Morita, Kanagawa (JP); Tetsu Takaishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/118,148

(22) PCT Filed: Feb. 24, 2015

(86) PCT No.: PCT/JP2015/055246
§ 371 (c)(1),
(2) Date: Aug. 11, 2016

(87) PCT Pub. No.: WO2015/129691
PCT Pub. Date: Sep. 3, 2015

(65) Prior Publication Data
US 2017/0166052 A1 Jun. 15, 2017

(30) Foreign Application Priority Data

Feb. 28, 2014 (JP) .................................. 2014-038479

(51) Int. Cl.
*B60K 23/08* (2006.01)
*B60K 17/02* (2006.01)
(Continued)

(52) U.S. Cl.
CPC .............. *B60K 23/08* (2013.01); *B60K 17/02* (2013.01); *B60K 17/34* (2013.01); *F16D 11/00* (2013.01);
(Continued)

(58) Field of Classification Search
CPC ........ B60K 23/08; B60K 17/02; B60K 23/02; F16D 48/06; F16D 21/00
See application file for complete search history.

(56) References Cited

U.S. PATENT DOCUMENTS

| | | | | |
|---|---|---|---|---|
| 8,720,633 B2 * | 5/2014 | Grutter | ............... | B60K 17/344 180/233 |
| 9,272,619 B2 * | 3/2016 | Quehenberger | ....... | B60K 17/35 |
| 9,352,647 B2 * | 5/2016 | Ibusuki | ............... | B60W 10/119 |

FOREIGN PATENT DOCUMENTS

| CN | 102166947 A | 8/2011 |
|---|---|---|
| CN | 102189928 A | 9/2011 |

(Continued)

*Primary Examiner* — Jacob S Scott
*Assistant Examiner* — Tinh Dang
(74) *Attorney, Agent, or Firm* — Global IP Counselors, LLP

(57) ABSTRACT

A clutch control device is provided for a 4-wheel drive vehicle. The clutch control device includes a 4WD control unit that controls the engagement and release of a friction clutch and a dog clutch which are arranged separately in the two paths. The 4WD control unit has a synchronization speed control unit, and at a time of transition from a disconnected, two-wheel drive mode, in which the friction clutch and the dog clutch are released, to a connected, four-wheel drive mode, in which the friction clutch and the dog clutch are engaged, the synchronization speed control unit reduces a synchronization speed of the dog clutch more during vehicle deceleration than when the vehicle is not decelerating.

19 Claims, 10 Drawing Sheets

(51) Int. Cl.
*B60K 17/34* (2006.01)
*F16D 48/06* (2006.01)
*F16D 21/00* (2006.01)
*F16D 11/00* (2006.01)
*F16D 13/00* (2006.01)
*F16D 23/02* (2006.01)

(52) U.S. Cl.
CPC ............ *F16D 13/00* (2013.01); *F16D 21/00* (2013.01); *F16D 23/02* (2013.01); *F16D 48/06* (2013.01); *F16D 2500/10431* (2013.01); *F16D 2500/3108* (2013.01); *F16D 2500/7061* (2013.01); *F16D 2500/70424* (2013.01)

(56) References Cited

FOREIGN PATENT DOCUMENTS

| | | |
|---|---|---|
| CN | 103287261 A | 9/2013 |
| CN | 103523009 A | 1/2014 |
| EP | 2 308 711 A1 | 4/2011 |
| JP | 60-30433 A | 2/1985 |
| JP | 2002-370557 A | 12/2002 |
| JP | 2004-9954 A | 1/2004 |
| JP | 2010-254058 A | 11/2010 |
| JP | 2011-143790 A | 7/2011 |
| WO | 97/29921 A1 | 8/1997 |

\* cited by examiner

CLUTCH CONTROL DEVICE FOR 4-WHEEL DRIVE VEHICLE

CROSS-REFERENCE TO RELATED APPLICATIONS

This application is a U.S. National stage application of International Application No. PCT/JP2015/055246, filed Feb. 24, 2015, which claims priority to JP Patent Application No. 2014-038479 filed on Feb. 28, 2014, the contents of which are hereby incorporated herein by reference.

BACKGROUND

Field of the Invention

The present invention generally relates to a clutch control device for a four-wheel drive vehicle in which a system for transmitting drive force to auxiliary drive wheels is provided with a dog clutch and a friction clutch.

Background Information

Conventionally, a front wheel drive based four-wheel drive vehicle in which a system for transmitting drive force to the rear wheels is provided with a dog clutch and a friction clutch is known (refer to, for example, Japanese Laid-Open Patent Application No. 2010-254058). In this four-wheel drive vehicle, when switching from a two-wheel drive mode to a four-wheel drive mode, the dog clutch is engaged after the friction clutch is engaged and the drive source side and the rear wheel side of the dog clutch are synchronized. In addition, when switching from a four-wheel drive mode to a two-wheel drive mode, the dog clutch is released after the friction clutch is released.

SUMMARY

In the prior art described above, when switching from the two-wheel drive mode to the four-wheel drive mode or the like, and the dog clutch is engaged from a disengaged state, if the synchronization speed is increased, the control response will be excellent, but the shock at the time of engagement is increased. When shock occurs at the time of engagement in this manner, there is the risk of adversely affecting vehicle behavior and the sound and vibration levels of the vehicle; in addition, the generation of such sound and vibration levels becomes significant upon deceleration as opposed to acceleration. On the other hand, if the synchronization speed is constantly reduced so that shock does not occur at the time of engagement, the control response deteriorates; in particular, a control response delay during acceleration becomes a problem when it is desired to stabilize vehicle behavior.

In view of the problems described above, an object of the present invention is to provide a clutch control device for a four-wheel drive vehicle capable of achieving an improvement in the stabilization of vehicle behavior and an improvement in the sound and vibration levels by achieving an optimization in the synchronization speed of the dog clutch.

In order to achieve the object described above, the present invention relates to a drive power transmission device characterized in that: a clutch control device for a four-wheel drive vehicle provided with, as clutches interposed between a drive source and drive wheels, a dog clutch and a friction clutch that are respectively arranged separately in a drive branch-side transmission system path and in an auxiliary drive wheel-side transmission system path, which sandwich a differential, of a system for transmitting drive force to the auxiliary drive wheels, wherein a clutch control unit that controls engagement and disengagement of the dog clutch and the friction clutch is provided with a synchronization speed control unit that reduces the synchronization speed of the dog clutch more during vehicle deceleration than when the vehicle is not decelerating at the time of transition from a disconnected, two-wheel drive mode in which both clutches are released to a connected, four-wheel drive mode in which both clutches are engaged.

In the clutch control device for a four-wheel drive vehicle of the present invention, the clutch control unit reduces the synchronization speed of the dog clutch more when engaging the dog clutch during deceleration than when the vehicle is not decelerating. The shock that is generated by engagement of the dog clutch during deceleration can thereby be reduced relative to when the vehicle is not decelerating, so that it becomes possible to achieve an improvement in the sound and vibration levels of the vehicle. On the other hand, the clutch control unit controls the synchronization speed of the dog clutch to be higher when engaging the dog clutch when the vehicle is not decelerating than when the vehicle is decelerating. The engagement timing of the dog clutch when the vehicle is not decelerating, such as during acceleration, thereby becomes faster than during deceleration; therefore, the control response is increased, and it becomes possible to achieve an improvement in the stability of the vehicle behavior.

DETAILED DESCRIPTION OF THE EMBODIMENTS

Figure 1:
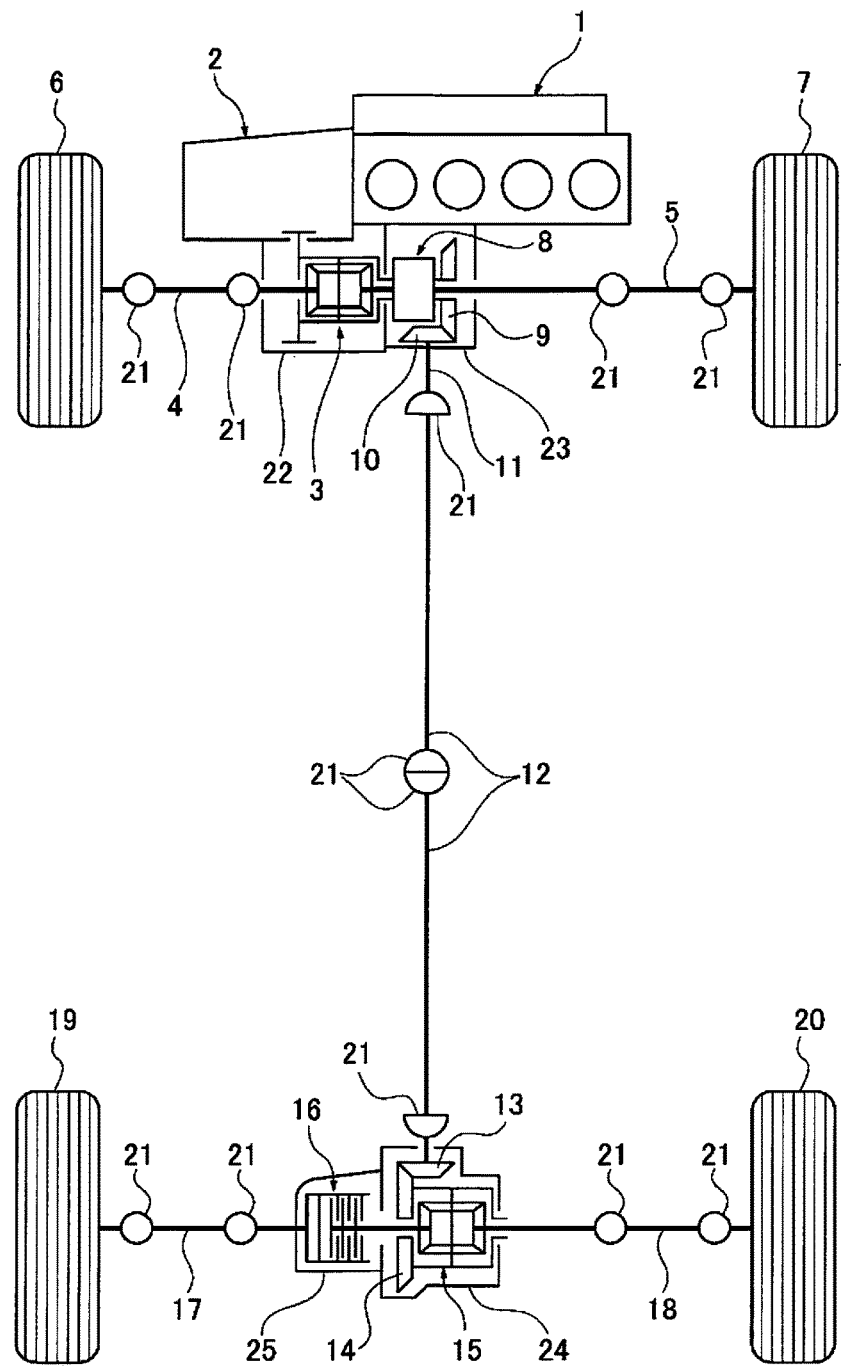
FIG. 1 is a block view of the drive system illustrating the configuration of the drive system of a front wheel drive based four-wheel drive vehicle to which is applied the clutch control device of the first embodiment.

Preferred embodiments for realizing the clutch control device for a four-wheel drive vehicle of the present invention will be described below based on the embodiments illustrated in the drawings.

First Embodiment

Referring initially to FIG. 1, a front wheel drive based four-wheel drive vehicle (one example of a four-wheel drive vehicle) is schematically illustrated with a clutch control device in accordance with a first embodiment.

Drive System Configuration of the Four-Wheel Drive Vehicle

FIG. 1 illustrates the configuration of the drive system of a front wheel drive based four-wheel drive vehicle to which is applied the clutch control device of the first embodiment. The drive system configuration of the four-wheel drive vehicle will be described below based on FIG. 1.

The front wheel drive system of the four-wheel drive vehicle is provided with a transverse engine 1 (drive source), a transmission 2, a front differential 3, a left front wheel drive shaft 4, a right front wheel drive shaft 5, a left front wheel 6 (main drive wheel), and a right front wheel 7 (main drive wheel), as illustrated in FIG. 1. That is, the drive force is transmitted from the transverse engine 1 and the transmission 2 to the left and right front wheel drive shafts 4, 5 via the front differential 3, and constantly drives the left and right front wheels 6 and 7 while allowing a differential rotation.

The rear wheel drive system of the four-wheel drive vehicle comprises a dog clutch 8 (dog clutch), a bevel gear 9, an output pinion 10, a rear wheel output shaft 11, and a propeller shaft 12, as illustrated in FIG. 1. Further provided are a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel). In FIG. 1, a universal joint 21 is provided.

That is, the drive system of the four-wheel drive vehicle is configured to be capable of selecting a two-wheel drive mode (=disconnected, two-wheel drive mode) in which both the dog clutch 8 and the electronically controlled coupling 16 are disengaged. In a disengaged state of the dog clutch 8 and the electronically controlled coupling 16, friction loss and oil stirring loss are suppressed and improved fuel efficiency is achieved by arresting the rotation between the ring gear 14 and the bevel gear 9 of the rear wheel drive system.

Figure 2:
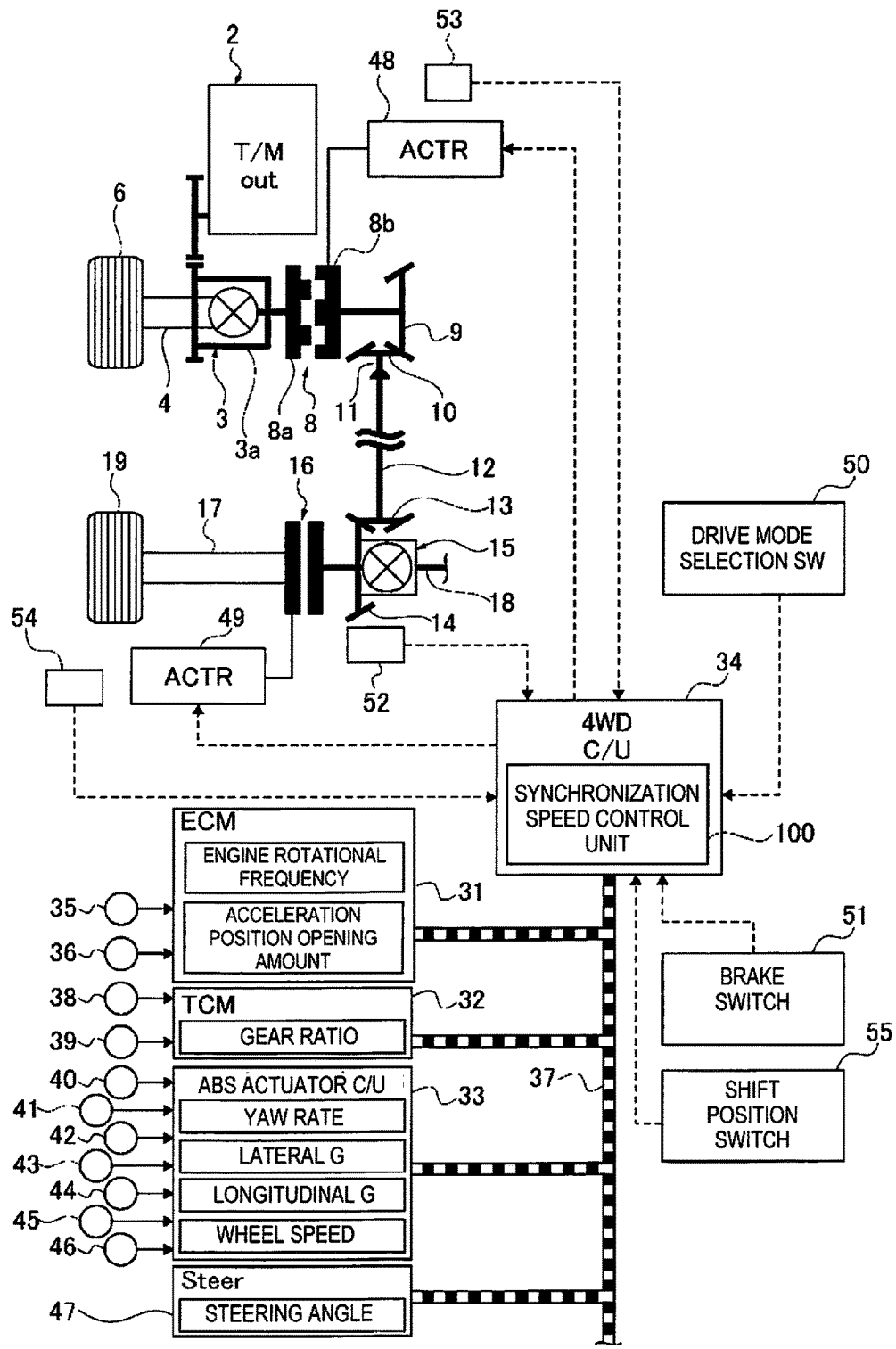
FIG. 2 is a block view of the control system illustrating the configuration of the control system of the front wheel drive based four-wheel drive vehicle to which is applied the clutch control device of the first embodiment.

The dog clutch 8 is a dog clutch that is provided at a drive branch position from the left and right front wheels 6 and 7 to the left and right rear wheels 19 and 20, and that separates the system for transmitting drive force to the left and right rear wheels 19 and 20 from the system for transmitting drive force to the left and right front wheels 6 and 7 by releasing the clutch. The dog clutch 8 is disposed in a position upstream of the bevel gear 9 and the output pinion 10, configuring a transfer mechanism, provided at a drive branch position to the left and right rear wheels 19 and 20. In addition, an input side meshing member 8a of the dog clutch 8, illustrated in FIG. 2, is connected to a differential case 3a of the front differential 3, and an output side meshing member 8b of the dog clutch 8 is connected to the bevel gear 9.

Again with reference to FIG. 1, the dog clutch 8, the bevel gear 9, the output pinion 10, and a portion of the rear wheel output shaft 11 are incorporated in a transfer case 23 that is fixed to a position adjacent to the front differential housing 22. For example, a dog clutch in which one of a pair of meshing members 8a and 8b (refer to FIG. 2) is a fixing member and the other is a movable member, in which a spring that biases in the engaging direction is provided between the fixing member and the movable member, and in which a screw groove that can be fitted with a solenoid pin is formed on the outer perimeter of the movable member, is used as this dog clutch 8. When the solenoid pin is projected and fitted to the screw groove, this dog clutch 8 releases the engagement due to the movable member making a stroke in the releasing direction while being rotated and the stroke amount exceeding a predetermined amount. On the other hand, when the dog clutch 8 is engaged and the fitting of the solenoid pin with respect to the screw groove is disengaged, the movable member makes a stroke in the engaging direction toward the fixing member due to the biasing force of the spring, or the like, and the teeth of the two 8a and 8b are meshed and engaged.

The electronically controlled coupling 16 is a friction clutch that is provided in a downstream position of the dog clutch 8, and that allocates a portion of the drive force from the transverse engine 1 to the left and right rear wheels 19 and 20, in accordance with the clutch engagement capacity. This electronically controlled coupling 16 is configured to be disposed in the position of the left rear wheel drive shaft 17, which extends to the left rear wheel 19, downstream of the bevel gear 9 and the output pinion 10, which configure the transfer mechanism, via the propeller shaft 12 and the rear differential 15. An input side clutch plate of the electronically controlled coupling 16 is connected to a left side gear of the rear differential 15, and an output side clutch plate is connected to the left rear wheel drive shaft 17.

Also, this electronically controlled coupling 16 is incorporated in a coupling case 25 that is fixed in a position adjacent to a rear differential housing 24. For example, an electronically controlled coupling comprising a multi-plate friction clutch in which a plurality of input-side and output-side plates are alternately arranged, a fixed cam piston (not shown) and a movable cam piston (not shown) which have opposing cam surfaces, and a cam member (not shown) that is interposed between the opposing cam surfaces, is used as this electronically controlled coupling 16.

The engagement of the electronically controlled coupling 16 is carried out by rotating the movable cam piston (not shown) in a predetermined engaging direction with an electric motor (electronically controlled coupling actuator 49 illustrated in FIG. 2). The movable cam piston (not shown) is moved in a clutch engaging direction in accordance with the rotation angle to increase the frictional engagement force of the multi-plate friction clutch, due to a cam action that expands the piston gap. The release of the electronically controlled coupling 16 is carried out by rotating the movable cam piston (not shown) in the opposite direction of the engaging direction with the electric motor (electronically controlled coupling actuator 49 illustrated in FIG. 2). The movable cam piston (not shown) makes a stroke in the clutch disengaging direction in accordance with the rotation angle to decrease the frictional engagement force of the multi-plate friction clutch, due to a cam action that reduces the piston gap.

Control System Configuration of the Four-Wheel Drive Vehicle

FIG. 2 illustrates the configuration of the drive system of a front wheel drive based four-wheel drive vehicle to which is applied the clutch control device of the first embodiment. The control system configuration of the four-wheel drive vehicle will be described below based on FIG. 2.

The control system of the four-wheel drive vehicle is provided with an engine control module 31, a transmission control module 32, an ABS actuator control unit 33, and a 4WD control unit 34, as illustrated in FIG. 2. Each of the control modules and each of the control units 31-34 are configured by an arithmetic processing unit, such as a microprocessor.

The engine control module 31 is a control device of the transverse engine 1, which inputs detection signals from an engine rotational frequency sensor 35, an accelerator position opening amount sensor 36, and the like, as vehicle state detection devices. Engine rotational frequency information and accelerator position opening amount information (ACC information) are input from this engine control module 31 to the 4WD control unit 34 via a CAN communication line 37.

The transmission control module 32 is a control device of the transmission 2, which inputs detection signals from a transmission input rotational frequency sensor 38, the transmission output rotational frequency sensor 39, and the like, as vehicle state detection devices. Gear ratio information (gear ratio information) is input from this transmission control module 32 to the 4WD control unit 34 via the CAN communication line 37.

The ABS actuator control unit 33 is a control device of an ABS actuator which controls the brake fluid pressure of each wheel, which inputs detection signals from a yaw rate sensor 40, a lateral G sensor 41, a longitudinal G sensor 42, wheel speed sensors 43, 44, 45, 46, and the like, as vehicle state detection devices. Yaw rate information, lateral G information, longitudinal G information, and wheel speed information of each wheel, are input from this ABS actuator control unit 33 to the 4WD control unit 34 via the CAN communication line 37. Besides the information described above, steering angle information from a steering angle sensor 47 is input to the 4WD control unit 34 via the CAN communication line 37.

The 4WD control unit (clutch control unit) 34 is a control device that controls the engagement and disengagement of the dog clutch 8 and the electronically controlled coupling 16, and carries out a calculation step based on various input information from each of the sensors as vehicle state detection devices. The control unit outputs drive control commands to a dog clutch actuator 48 (solenoid) and an electronically controlled coupling actuator 49 (electric motor). Here, besides CAN communication line 37, a drive mode selection switch 50, a brake switch 51 that detects the presence/absence of a braking operation, a ring gear rotational frequency sensor 52, a dog clutch stroke sensor 53, a motor rotation angle sensor 54, shift position switch 55, and the like are provided as input information sources.

The drive mode selection switch 50 is a switch with which a driver switches to select among a "2WD mode," a "lock mode," and an "auto mode." When the "2WD mode" is selected, a front wheel drive 2WD state, in which the dog clutch 8 and the electronically controlled coupling 16 are released, is maintained. When the "lock mode" is selected, a full 4WD state, in which the dog clutch 8 and the electronically controlled coupling 16 are engaged, is maintained.

Furthermore, when the "auto mode" is selected, the engagement and disengagement of the dog clutch 8 and the electronically controlled coupling 16 are automatically controlled in accordance with the vehicle state (vehicle speed VSP, accelerator position opening amount ACC). In the present first embodiment, the vehicle speed VSP is basically calculated from the wheel speed of the left and right rear wheels 19 and 20 as the auxiliary drive wheels.

In addition, in "auto mode," there is a choice between an "eco-auto mode" and a "sports auto mode," where the release state of the electronically controlled coupling 16 in "standby two-wheel drive mode," in which the dog clutch 8 is engaged, will differ and depends upon the selected mode. That is, when "eco-auto mode" is selected, the electronically controlled coupling 16 is put in a fully released state and waits, and when the "sports auto mode" is selected, the electronically controlled coupling 16 is put in a released state immediately before engagement and waits.

The ring gear rotational frequency sensor 52 is a sensor for acquiring output rotational speed information of the dog clutch 8, and which calculates the output side rotational frequency of the dog clutch 8 by taking into consideration of the rear side gear ratio and the front side gear ratio upon calculation with respect to the detected value of the ring gear rotational frequency. The input rotational speed information of the dog clutch 8 is obtained by calculating the average value of the left and right front wheel speeds.

Drive Mode Switching Configuration

Figure 3:
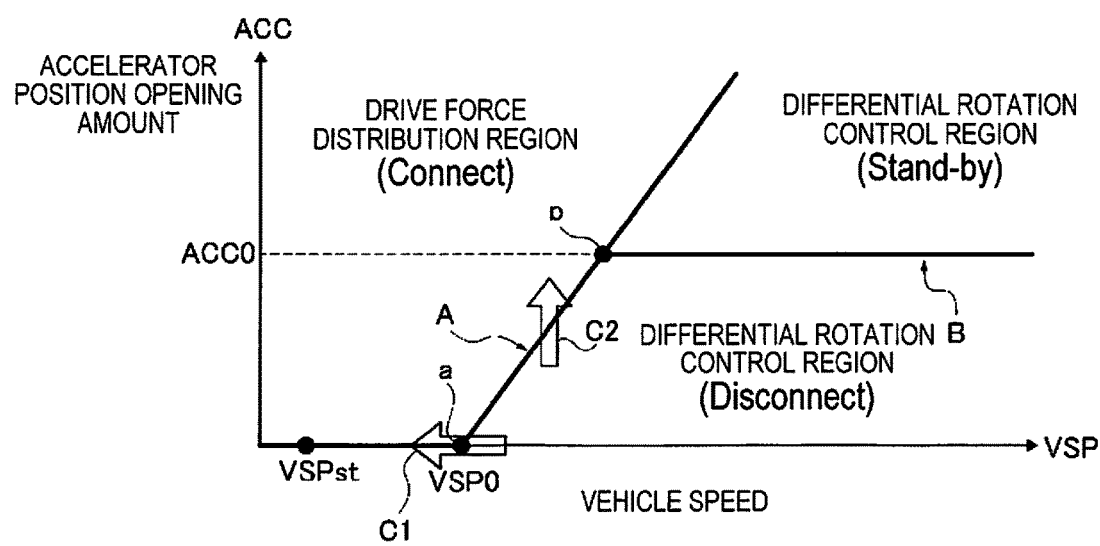
FIG. 3 is a basic map view illustrating a drive mode switching map corresponding to the vehicle speed and the accelerator position opening amount used in the clutch control, when the "auto mode" of the first embodiment is selected.
Figure 4:
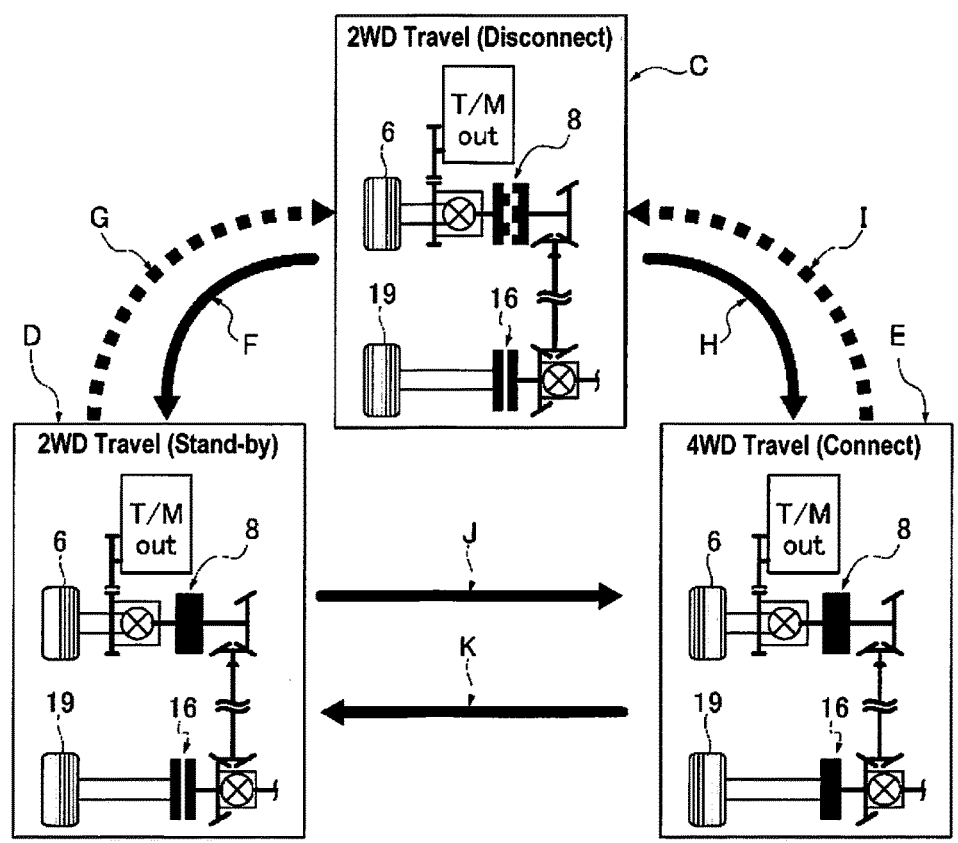
FIG. 4 is a drive mode transition view illustrating the switching transition of the drive mode (disconnected, two-wheel drive mode/standby two-wheel drive mode/connected, four-wheel drive mode) according to the clutch control by the clutch control device of the first embodiment.

FIG. 3 illustrates a drive mode switching map corresponding to the vehicle speed VSP and the accelerator position opening amount ACC used in the clutch control when the "auto mode" is selected, and FIG. 4 illustrates the switching transition of the drive mode (disconnected, two-wheel drive mode/standby two-wheel drive mode/connected, four-wheel drive mode). The drive mode switching configuration will be described below, based on FIG. 3 and FIG. 4.

The drive mode switching map is set to be separated into a differential rotation control region (Disconnect), which is a control region for the disconnected, two-wheel drive mode; a differential rotation control region (Standby), which is a control region for the standby two-wheel drive mode; and a drive force distribution region (Connect), which is a control region for the connected, four-wheel drive mode, in accordance with the vehicle speed VSP and the accelerator position opening amount ACC, as illustrated in FIG. 3. These three regions are separated by a region dividing line A in which the accelerator position opening amount ACC is increased proportionally with the increase in the vehicle speed VSP from a base point a of a set vehicle speed VSP0 at which the accelerator position opening amount is zero, and a region dividing line B of a constant accelerator position opening amount ACC0, which is drawn from an intersection b with the region dividing line A toward the high vehicle speed side.

The differential rotation control region (Disconnect), which is a control region to the disconnected, two-wheel drive mode, is set in the region in which the accelerator position opening amount ACC is less than or equal to the set opening amount ACC0, and which is surrounded by the vehicle speed axis line on which the accelerator position opening amount ACC is zero, the region dividing line A, and the region dividing line B. That is, the region is set in a region in which the frequency of occurrence of the differential rotation of the left and right front wheels 6 and 7 and the left and right rear wheels 19 and 20 due to wheel slip is extremely low, since the accelerator position opening amount ACC is less than or equal to the set accelerator position opening amount ACC0, and even if wheel slip does occur, the four-wheel drive requirement is low so that slip increases slowly.

The differential rotation control region (Standby), which is a control region for the standby two-wheel drive mode, is set in the region in which the accelerator position opening amount ACC exceeds the set accelerator position opening amount ACC0, and which is surrounded by the region dividing line A and the region dividing line B. That is, the region is set in a region in which, since the accelerator position opening amount ACC exceeds the set accelerator position opening amount ACC0 but the vehicle speed VSP is in a high vehicle speed region, while the 4WD requirement is low, if differential rotation of the left and right front wheels 6 and 7 and the left and right rear wheels 19 and 20 is generated due to wheel slip, there is a high probability that slip will increase rapidly.

The drive force distribution region (Connect), which is a control region for the connected, four-wheel drive mode, is set in the region surrounded by the accelerator position opening amount axis line on which the vehicle speed VSP is zero, the vehicle speed axis line on which the accelerator position opening amount ACC is zero, the region dividing line A. That is, the mode is set in a region in which the 4WD requirement is high, such as when starting or during high-load travel in which the vehicle speed VSP is low but the accelerator position opening amount ACC is high.

When the disconnected, two-wheel drive mode (Disconnect) is selected, the travel mode becomes 2WD travel (Disconnect) in which both the dog clutch 8 and the electronically controlled coupling 16 are released, as illustrated in frame C of FIG. 4. Basically, in this disconnected, two-wheel drive mode, a front wheel drive 2WD travel (Disconnect), in which drive force is transmitted only to the left and right front wheels 6 and 7, is maintained. However, if the left and right front wheels 6 and 7 slip during front wheel drive 2WD travel and the wheel slip amount (or the wheel slip rate) exceeds a threshold value, the electronically controlled coupling 16 is frictionally engaged. Thereafter, if a rotationally synchronized state is determined, differential rotation control to suppress wheel slip is carried out by engaging the dog clutch 8 and allocating drive force to the left and right rear wheels 19 and 20.

When the standby two-wheel drive mode (Standby) is selected, the travel mode becomes 2WD travel (Standby) in which the dog clutch 8 is engaged and the electronically controlled coupling 16 is released, as illustrated in frame D of FIG. 4. Basically, in this standby two-wheel drive mode, front wheel drive 2WD travel (Standby), in which drive force is transmitted only to the left and right front wheels 6 and 7, is maintained. However, if the left and right front wheels 6 and 7 slip during front wheel drive 2WD travel and the wheel slip amount (or the wheel slip rate) exceeds a threshold value, only the electronically controlled coupling 16 is frictionally engaged, since the dog clutch 8 has already been engaged. Differential rotation control to suppress wheel slip is carried out by allocating drive force to the left and right rear wheels 19 and 20 with good responsiveness by this frictional engagement of the electronically controlled coupling 16.

When the connected, four-wheel drive mode (Connect) is selected, the travel mode becomes 4WD travel (Connect) in which both the dog clutch 8 and the electronically controlled coupling 16 are engaged, as illustrated in frame E of FIG. 4. Basically, in this connected, four-wheel drive mode (Connect), a drive force distribution control is carried out, which achieves the optimum drive force distribution to the left and right front wheels 6 and 7, and to the left and right rear wheels 19 and 20 that is suited to the road conditions (for example, distribution control to the front and rear wheels at the time of start). However, if a turning state of the vehicle is determined during 4WD travel from information from the steering angle sensor 47, the yaw rate sensor 40, the lateral G sensor 41, or the longitudinal G sensor 42, a control is carried out in which the engagement capacity of the electronically controlled coupling 16 is decreased to reduce to the possibility of the occurrence of a tight corner braking phenomenon.

The switching transition between the 2WD travel (Disconnect), 2WD travel (Standby), and 4WD travel (Connect) in FIG. 4 is carried out by a switching request that is output when an operating point, which is determined by the vehicle speed VSP and the accelerator position opening amount ACC, crosses the region dividing line A and the region dividing line B illustrated in FIG. 3. The switching transition speed of each drive mode is determined so that the transition speed to a drive mode that meets a 4WD request is prioritized over the transition speed to the disconnected, two-wheel drive mode that meets a fuel efficiency request. That is, the switching transition speed of 2WD travel (Disconnect)→2WD travel (Standby) (arrow F in FIG. 4) is configured to be fast, and the switching transition speed of 2WD travel (Standby)→2WD travel (Disconnect) (arrow G in FIG. 4) is configured to be slow. Similarly, the switching transition speed of 2WD travel (Disconnect)→4WD travel (Connect) (arrow H in FIG. 4) is configured to be fast, and the switching transition speed of 4WD travel (Connect)→2WD travel (Disconnect) (arrow I in FIG. 4) is configured to be slow. In contrast, the switching transition speed of 2WD travel (Standby)→4WD travel (Connect) (arrow J in FIG. 4) is configured to be the same fast speed as the switching transition speed of 4WD travel (Connect)→2WD travel (Standby) (arrow K in FIG. 4).

Clutch Control Configuration

Figure 5:
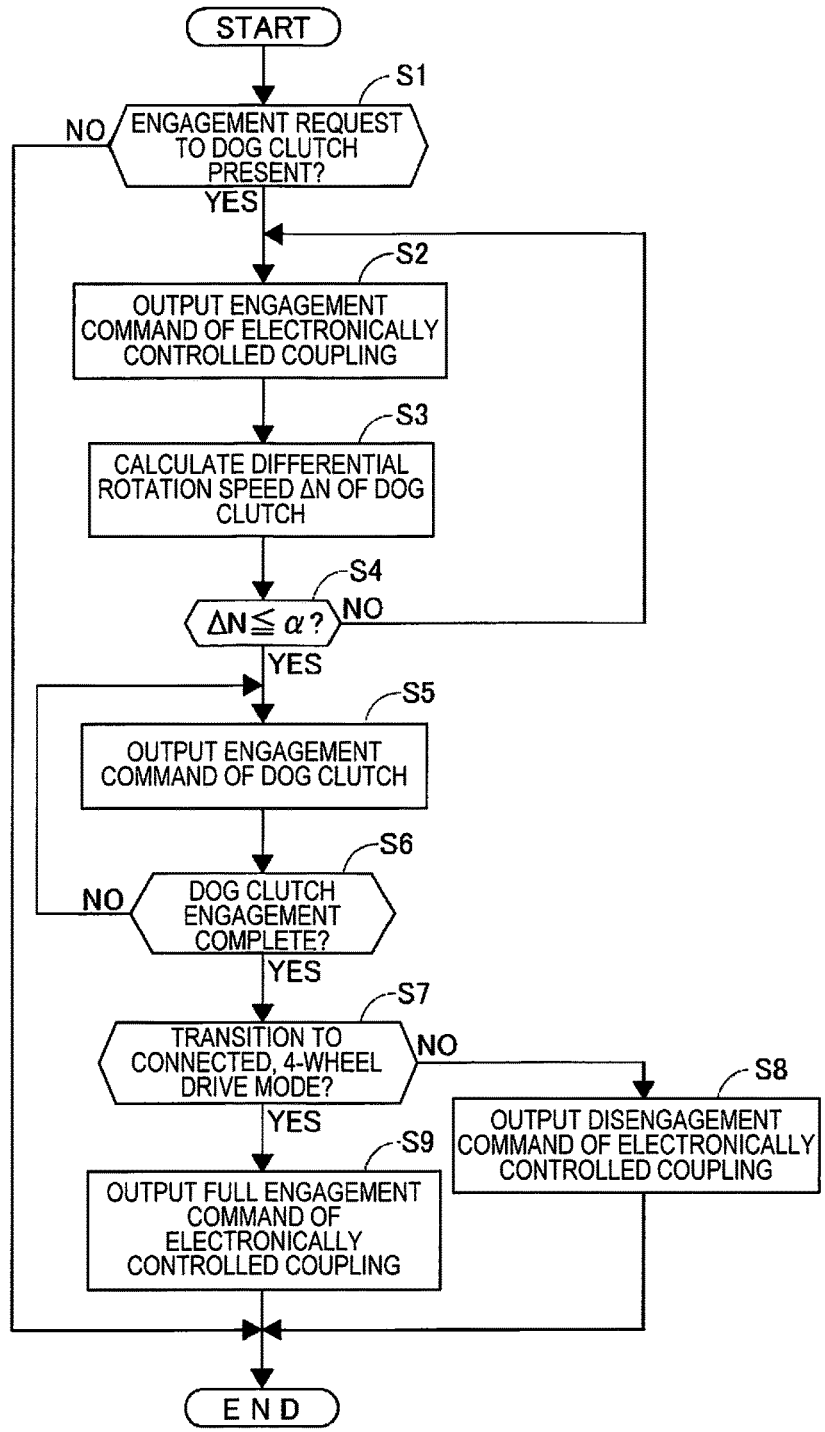
FIG. 5 is a flowchart illustrating the flow of clutch control process during "auto mode" that is executed by the 4WD control unit of the clutch control device for a four-wheel drive vehicle of the first embodiment.

FIG. 5 illustrates the flow of the clutch control process that is executed in the 4WD control unit 34 when engaging the dog clutch 8. That is, the clutch control process when transitioning to the drive force distribution region (Connect) and when transitioning to the differential rotation control region (Standby), from the differential rotation control region (Disconnect), in which the vehicle state is controlled to the disconnected, two-wheel drive mode, in the drive mode map of FIG. 3, will be described. These clutch control process is repeated at a predetermined cycle of about 10-30 ms.

Each step in FIG. 5 will be described below. In Step S1, it is determined whether or not there is a request to engage the dog clutch 8; when this engagement request is present, the process proceeds to Step S2, and when the engagement request is not present, one set of steps is ended. This request to engage the dog clutch 8 is made when there is a mode transition request to either the connected, four-wheel drive mode or the standby, two-wheel drive mode.

In Step S2, to which the process proceeds when a request to engage the dog clutch 8 is present, an engagement command of the electronically controlled coupling 16 is output, after which the process proceeds to Step S3. In the following Step S3, the differential rotation speed ΔN of the input and output side meshing members 8*a* and 8*b* of the dog clutch 8 is calculated, after which the process proceeds to Step S4.

In Step S4, it determined whether or not the differential rotation speed ΔN that is calculated in Step S3 has become less than or equal to a synchronization determination threshold value α which is set in advance, that is, whether or not the dog clutch 8 has been placed in a synchronized state. Then, if ΔN≤α (dog clutch synchronized), the process proceeds to Step S5, and if ΔN>α (dog clutch not synchronized), the process returns to Step S2.

In Step S5, to which the process proceeds when the dog clutch 8 is determined to be synchronized, an engagement command of the dog clutch 8 is output, after which the process proceeds to Step S6. The engagement at this time is an engagement for synchronous rotation of the dog clutch 8 and an engagement with a lower transmission torque than the transmission torque during full engagement in the connected, four-wheel drive mode. In Step S6, whether or not the engagement of the dog clutch 8 is completed is determined. Then, if the engagement is completed, the process proceeds to Step S7, and if the engagement is incomplete, the process returns to Step S5. For the determination of engagement complete in Step S6, the engagement is determined to be completed when it is detected that the movable member makes a stroke that exceeds a set amount based on a detection of the dog clutch stroke sensor 53.

In Step S7, to which the process proceeds at the time of engagement completion of the dog clutch 8, it is determined whether or not the drive mode transition based on the drive mode switching map of FIG. 3 is a transition to the connected, four-wheel drive mode. If the transition is to the connected, four-wheel drive mode, the process proceeds to Step S9 and the electronically controlled coupling 16 is fully engaged, after which one set of control steps is ended. Additionally, if the transition is not to the connected, four-wheel drive mode in Step S7, that is, if the transition is to the standby, two-wheel drive mode, the process proceeds to Step S8 and a disengagement command of the electronically controlled coupling 16 is output, after which one set of control steps is ended.

Synchronization Speed Setting Process

Next, a control of the synchronization speed of the dog clutch 8 based on an engagement speed control when an engagement command of the electronically controlled coupling is output in Step S2, will be described. That is, in the first embodiment, the 4WD control unit 34 comprises a synchronization speed control unit 100, as illustrated in FIG. 2. This synchronization speed control unit 100 controls the speed from synchronization start to synchronization complete (synchronization rate), when the input side meshing member 8*a* and the output side meshing member 8*b* synchronously rotate accompanying an engagement of the dog clutch 8. This synchronization speed (synchronization rate) shall be a normal speed (normal synchronization rate) during acceleration as well as during constant speed travel, except during deceleration. On the other hand, during vehicle deceleration, the synchronization speed (synchronization rate) is controlled to a speed below the normal speed, and, at this time, the speed is controlled according to the rate of deceleration so as to decrease as the rate of deceleration increases.

Figure 6:
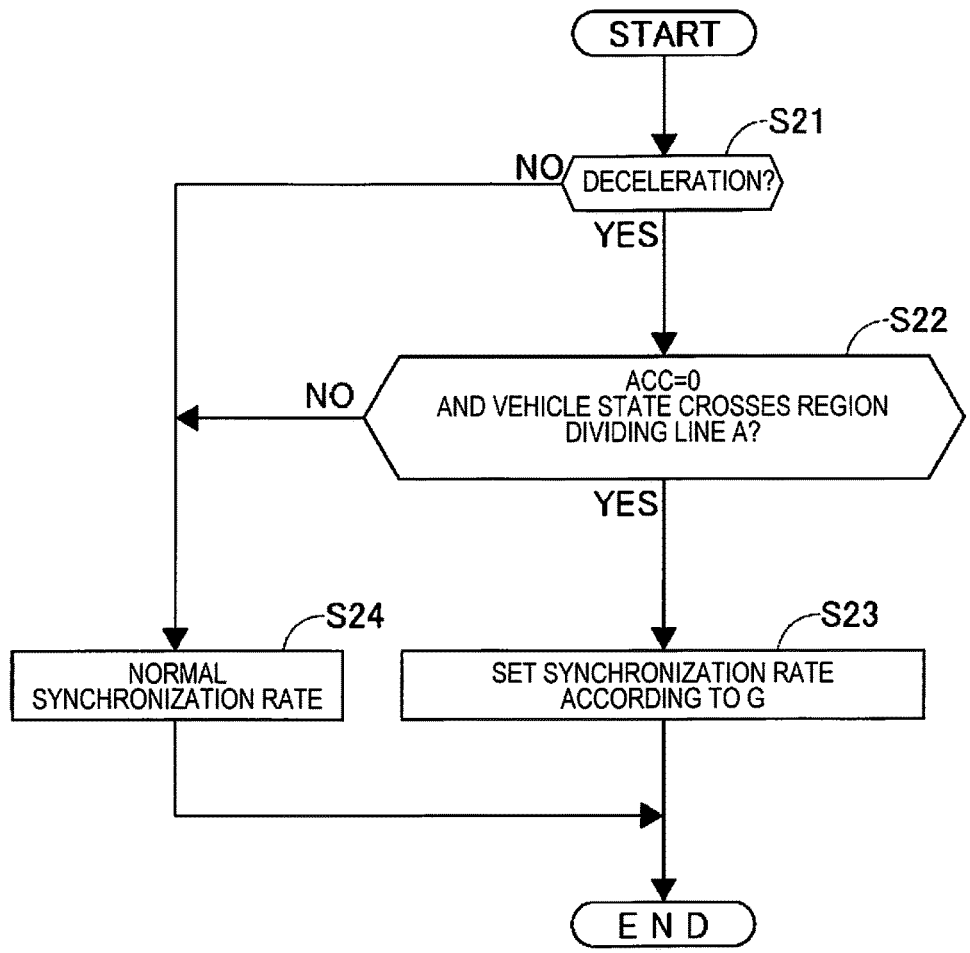
FIG. 6 is a flowchart illustrating the flow of synchronization speed control process that is executed by the synchronization speed control unit of the clutch control device for a four-wheel drive vehicle of the first embodiment.

The flow of these synchronization speed control process will be described on the basis of the flowchart of FIG. 6. First, in Step S21, it is determined whether or not the vehicle is in a deceleration state; if in the deceleration state, that is, if the vehicle speed VSP is decreasing, the process proceeds to Step S22, and if in a non-deceleration state (acceleration state or constant speed state), the process proceeds to Step S24.

In Step S22, it is determined whether or not the accelerator position opening amount ACC=0, and the vehicle state (vehicle speed VSP and accelerator position opening amount ACC) has crossed the region dividing line A in the deceleration direction, that is, whether or not the transition of the vehicle state is the arrow C1 in FIG. 3. Then, if the conditions of Step S22 are met, the process proceeds to Step S23, and if any of the conditions are not met, the process proceeds to Step S24.

In Step S24, the synchronization rate is set to the normal synchronization rate, which is set in advance. On the other hand, in Step S23, the synchronization rate, which is the time required for synchronizing the dog clutch 8, is set to a speed below the normal synchronization rate (low synchronization rate). Furthermore, in Step S23, upon setting the synchronization rate, the synchronization rate is set lower (set to a low speed) as the absolute value of the rate of deceleration is increased in accordance with the rate of deceleration when the vehicle state crosses region dividing line A in the arrow C1 direction. The synchronization rate corresponds to the time required for synchronizing the dog clutch 8; synchronization is performed more quickly as the synchronization rate increases, and the time required for synchronization is set to increases as the synchronization rate decreases.

Figure 8:
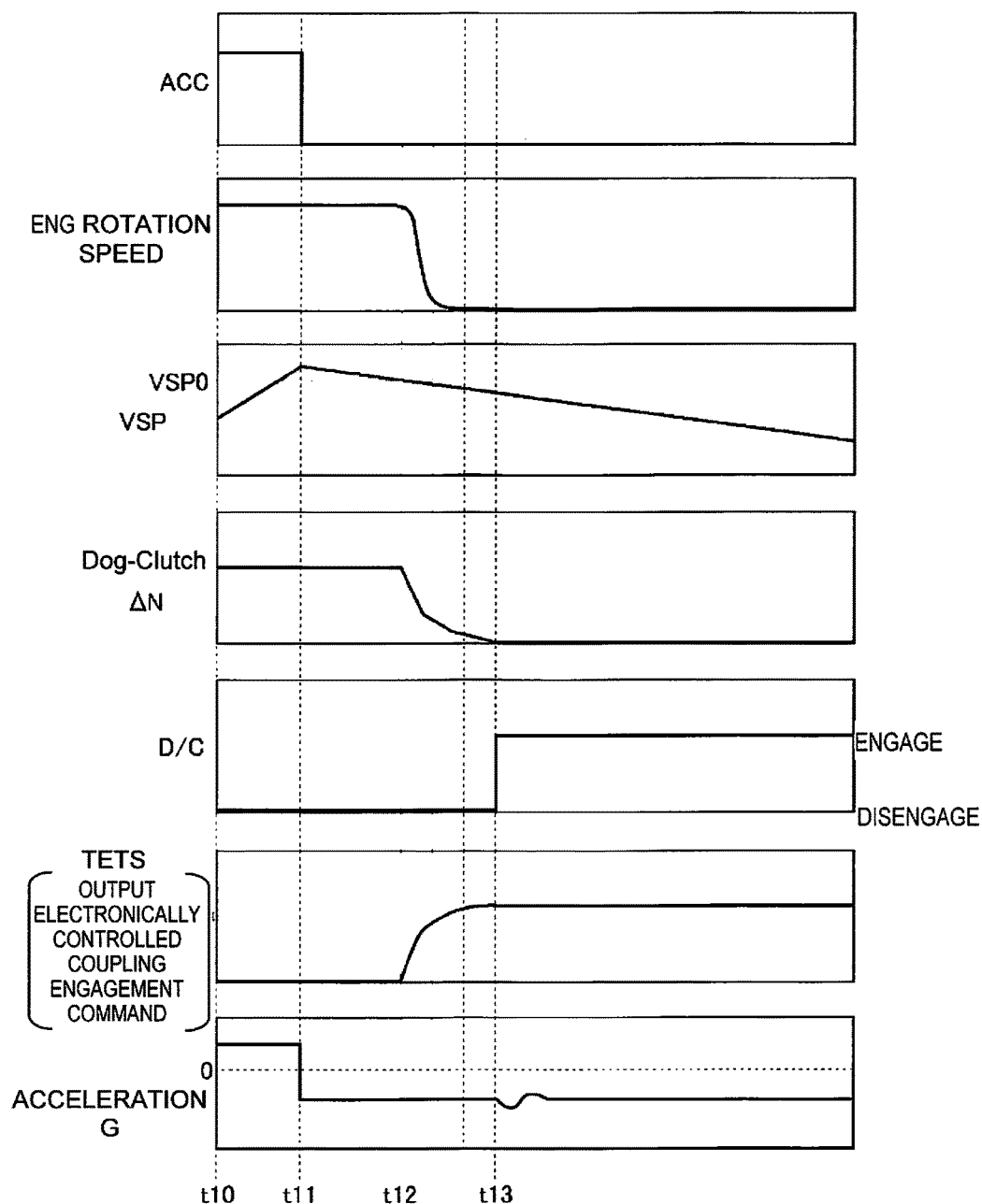
FIG. 8 is a time chart illustrating the operation when the synchronization speed of the dog clutch is reduced during vehicle deceleration by the clutch control device for a four-wheel drive vehicle of the first embodiment.

In addition, the synchronization rate is set according to the engagement speed of the electronically controlled coupling 16. That is, the engagement speed of the electronically controlled coupling 16 decreases as the synchronization rate decreases. The engagement speed of the electronically controlled coupling 16, on the other hand, increases as the synchronization rate increases. In the present first embodiment, during the initial stage, when the plates of the multi-plate run idle with each other, the engagement command of the electronically controlled coupling 16 sets the engagement speed to be high, and sets the engagement speed after completion of idling according to the rate of deceleration so as to make a gradually rising slope that follows a quadratic curve rotated 90°, as illustrated in FIG. 8. The degree to which this engagement output command TETS to the electronically controlled coupling 16 varies to make a rising slope gradual is set to increase as the rate of deceleration increases.

Actions of the First Embodiment

Next, the actions of the first embodiment will be described based on the time charts of FIGS. 7 and 8. First, before describing the actions of the first embodiment, the actions of a comparative example of the present embodiment will be described.

Figure 7:
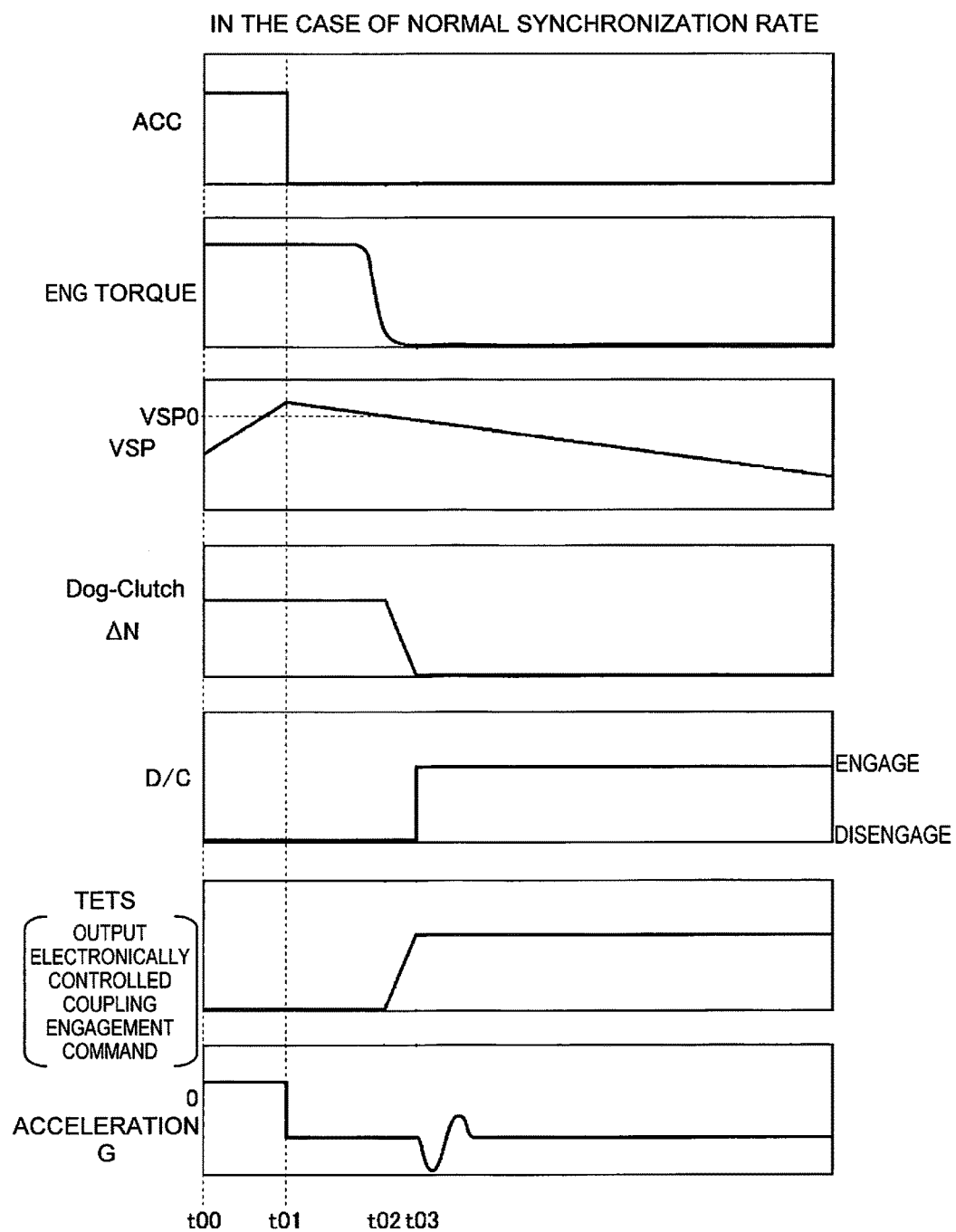
FIG. 7 is a time chart illustrating the operation of a comparative example of the first embodiment, in which the synchronization speed of the dog clutch is not reduced during vehicle deceleration.

FIG. 7 is a time chart illustrating the operation of a comparative example in which the synchronization control of the dog clutch 8 is carried out at a synchronization rate that is similar to that when the vehicle is not decelerating, without carrying out a variable control of the synchronization rate.

In this comparative example, at time t00, the driver is depressing the accelerator pedal, which is not shown, to accelerate the vehicle. Then, after t01, the driver lifts his or her foot off the accelerator pedal, which is not shown, and the vehicle enters a coasting state, during which the engine brake acts.

With this coasting, at time t02, the vehicle speed VSP crosses a set vehicle speed VSP0, which forms the region dividing line A, as illustrated by arrow C1 in FIG. 3, and the drive mode is transitioned from the disconnected, two-wheel drive mode to the connected, four-wheel drive mode. With this drive mode transition, the engagement of the electronically controlled coupling 16 is started (Step S2). Thus, in the dog clutch 8, the rotation speed of the output side meshing member 8b is increased so as to be in synchronous rotation with the input side meshing member 8a, and the differential rotation speed ΔN of the two will decrease from time t02 to time t03. Then, when the differential rotation speed ΔN becomes less than or equal to the synchronization determination threshold value α, the dog clutch 8 is engaged (Step S2→S3→S4→S5). At this time, in the dog clutch 8, the change in the differential rotation speed ΔN is relatively large, i.e., the decreasing gradient of the differential rotation speed ΔN is steep as illustrated in FIG. 7; if the dog clutch 8 is engaged in this state, the shock at the time of engagement is relatively large. Consequently, a change in the acceleration/deceleration G, as shown in the drawing, occurs at the time of engaging the dog clutch 8. In addition, at this time, since the driver is in a state in which his or her foot is away from the accelerator pedal, which is not shown, and not performing an operation, the driver is more apt to feel a shock compared to when accelerating by depressing the accelerator pedal, which is not shown, during which time the engine rotation speed increases.

In contrast, the first embodiment is capable of suppressing the generation of this shock at the time of engagement of the dog clutch 8; the operation of the first embodiment will now be described below based on the time chart of FIG. 8.

In the operation example of FIG. 8, the driver is carrying out the same operation as in FIG. 7. That is, at time t10, the driver is depressing the accelerator pedal, which is not shown, to accelerate the vehicle. Then, after t11, the driver lifts his or her foot off the accelerator pedal, which is not shown, and the vehicle enters a coasting state, during which the engine brake acts.

With this coasting, at time t12, the vehicle speed VSP crosses a set vehicle speed VSP0, which forms the region dividing line A as illustrated by arrow C1 in FIG. 3, and the drive mode is transitioned from the disconnected, two-wheel drive mode to the connected, four-wheel drive mode. With this drive mode transition, the engagement of the electronically controlled coupling 16 is started (Step S2), and the rotation speed of the output side meshing member 8b is increased in the dog clutch 8.

Therefore, the differential rotation speed ΔN of the two meshing members 8a and 8b decreases from time t12, when the engagement of the electronically controlled coupling 16 is started, to time t13. Then, when the differential rotation speed ΔN becomes less than or equal to the synchronization determination threshold value α, the dog clutch 8 is engaged (Step S2→S3→S4→S5).

In this manner, when synchronizing the dog clutch 8 by an engagement of the electronic controlled coupling 16, in the first embodiment, if the accelerator position opening amount ACC=0 in a vehicle rate of deceleration and the vehicle state crosses the region dividing line A, the synchronization rate is determined according to the deceleration G at that time. That is, the synchronization rate is made lower than when the vehicle is not decelerating, and the synchronization rate is reduced more as the deceleration G increases.

As a result, the engagement output command TETS of the electronically controlled coupling 16 is raised more slowly than the comparative example of FIG. 7, and the decreasing gradient of the differential rotation speed ΔN of the dog clutch 8 becomes more gradual than that in the comparative example of FIG. 7. The engagement output command TETS at this time will be the same output as normal when outputting during the idling interval until actually starting the engagement; thereafter, the output is suppressed from the output corresponding to the stroke amount for actually carrying out torque transmission.

Therefore, the engagement of the dog clutch 8 is carried out in a state in which the change of the differential rotation speed ΔN is small; the shock at the time of engagement is thereby suppressed, and a change in the acceleration/deceleration G at the time can be suppressed. In this case, as shown, the time from t12, at which a switching of the drive mode is determined, to time t13 at which point the dog clutch 8 is engaged and the drive mode is actually switched to the connected, four-wheel drive mode, will be longer than in the comparative example of FIG. 7. However, the reason that the connected, four-wheel drive mode is selected in a low-speed range is to establish stability of acceleration at the time of start, and the main object of switching to the connected, four-wheel drive mode during deceleration is a switching of the drive mode in preparation for the next start. Therefore, even if the engagement timing of the dog clutch 8, that is, the timing to switch the drive mode, is delayed due to a reduction in the synchronization rate, there are no control problems.

On the other hand, when switching from the disconnected, two-wheel drive mode to the connected, four-wheel drive mode during acceleration (for example, when the vehicle state transitions as indicated by arrow C2 in FIG. 3), the synchronization rate is set to the normal synchronization rate, which is higher than during deceleration when engaging the electronically controlled coupling 16. The synchronization rate in this case is, for example, the synchronization rate illustrated in FIG. 7 (the rising gradient of the engagement output command TETS of the electronically controlled coupling 16). Accordingly, the drive mode can be switched with a higher control response than during deceleration, and the stability of the accelerating travel can be increased at an early stage. In addition, since the driver is depressing the accelerator pedal, which is not shown, during acceleration and an acceleration G is generated in the vehicle with increased engine rotation, the driver is less likely to feel engagement shock compared to when decelerating.

Effects of the First Embodiment

Both the effects and actions of the clutch control device for a four-wheel drive vehicle of the first embodiment are listed below.

1) In the clutch control device for a four-wheel drive vehicle of the first embodiment, in a four-wheel drive vehicle in which, of the left and right front wheels 6 and 7 and the left and right rear wheels 19 and 20, one pair is set as the main drive wheels which are connected to a drive source and the other pair is set as the auxiliary drive wheels which are connected to the drive source via a clutch, which comprises a dog clutch 8 as a dog clutch and an electronically controlled coupling 16 as a friction clutch which are respectively disposed separately in a drive branch-side transmission system path and in an auxiliary drive wheel-side transmission system path that sandwich a rear differential 15, of a system for transmitting drive force to the left and right rear wheels 19 and 20 as the auxiliary drive wheels, where the dog clutch 8 separates the system for transmitting drive force to the left and right rear wheels 19 and 20 from the system for transmitting drive force to the left and right front wheels 6 and 7 by release of the clutch, and the electronically controlled coupling 16 allocates a portion of the drive force from the engine 1 to the left and right rear wheels 19 and 20 in accordance with the clutch engagement capacity, and a 4WD control unit 34 as a clutch control unit that carries out the engagement and disengagement control of the dog clutch 8 and an engagement and disengagement control of the electronic controlled coupling 16 in accordance with the vehicle state that is detected by each of the sensor switches 35, 36, 38-47, 50-55, and which can switch between a disconnected, two-wheel drive mode in which the two clutches 8, 16 are disengaged and a connected, four-wheel drive mode in which the two clutches 8, 16 are engaged, wherein the 4WD control unit 34 is provided with a synchronization speed control unit 100 that reduces the synchronization speed of the dog clutch 8 more during vehicle deceleration than when the vehicle is not decelerating at the time of transition from the disconnected, two-wheel drive mode to the connected, four-wheel drive mode. In this manner, in the present first embodiment, the synchronization speed (synchronization rate) of the dog clutch 8 is reduced more during vehicle deceleration than when the vehicle is not decelerating when switching from the disconnected, two-wheel drive mode to the connected, four-wheel drive mode. Therefore, during vehicle deceleration, it is possible to suppress changes in the differential rotation speed ΔN between the input side meshing member 8a and the output side meshing member 8b of the dog clutch 8 compared to when a reduction of the synchronization speed is not carried out; it is thereby possible to suppress a generation of shock at the time of engagement. Thus, it is possible to reduce adverse effects on vehicle behavior as well as on sound and vibration levels of the vehicle when engaging the dog clutch 8. In addition, it is possible to secure responsiveness of the drive mode switching control during acceleration, or the like, by not decreasing the synchronization speed except during deceleration.

2) In the clutch control device for a four-wheel drive vehicle of the first embodiment, the 4WD control unit 34 carries out the synchronization of the dog clutch 8 when transitioning from the disconnected, two-wheel drive mode to the connected, four-wheel drive mode by engaging the electronically controlled coupling 16, and the synchronization speed control unit 100 executes a reduction of the synchronization speed by reducing the engagement speed of the electronic controlled coupling 16. In the first embodiment, when engaging the dog clutch 8, synchronization of the dog clutch 8 is carried out by engaging the electronically controlled coupling 16 and transmitting the rotation of the left and right rear wheels 19 and 20, which are the auxiliary drive wheels, to the output side meshing member 8b of the dog clutch 8. Therefore, it is possible to decrease the synchronization speed of the dog clutch 8 by reducing the engagement speed of the electronically controlled coupling 16 to below the engagement speed when the vehicle is not decelerating. Accordingly, execution of synchronization is possible at a lower cost compared to when reducing the synchronization speed by providing an actuator or a mechanism to adjust the synchronization speed to the dog clutch 8.

3) In the clutch control device for a four-wheel drive vehicle of the first embodiment, the synchronization speed control unit 100 reduces the synchronization speed during deceleration when the accelerator position opening amount ACC is zero. Since accelerator position opening amount ACC=0 is added to the conditions for reducing the synchronization speed during vehicle deceleration, a control to reduce the synchronization speed is not carried out when a deceleration occurs in a state in which the accelerator pedal is depressed, such as when traveling uphill. It is thereby possible to secure travel stability by carrying out switching from the disconnected, two-wheel drive mode to the connected, four-wheel drive mode with good responsiveness, when in a state in which the accelerator pedal is depressed, such as when traveling uphill.

4) In the clutch control device for a four-wheel drive vehicle of the first embodiment, the synchronization speed control unit 100 reduces the synchronization speed more as the vehicle rate of deceleration increases, when the synchronization speed is lowered. Since changes in the rotation speed are greater when the vehicle rate of deceleration is high compared to when the vehicle rate of deceleration is low, shock tends to be greater when engaging the dog clutch 8. Therefore, by suppressing changes in the rotational speed difference ΔN of the dog clutch 8 by decreasing the synchronization speed more as the vehicle rate of deceleration increases, it is possible to further suppress shock at the time of engagement. It has thereby become possible to reduce adverse effects on vehicle behavior as well as the generation of sound and vibration levels of the vehicle, when engaging the dog clutch 8.

5) In the clutch control device for a four-wheel drive vehicle of the first embodiment, the 4WD control unit 34 switches between the disconnected, two-wheel drive mode and the connected, four-wheel drive mode based on the mode switching map illustrated in FIG. 3, in which the disconnected, two-wheel drive mode and the connected, four-wheel drive mode are set in accordance with the accelerator position opening amount ACC and the vehicle speed VSP, and sets a control region to the connected, four-wheel drive mode in a lower speed region than to the disconnected, two-wheel drive mode. Therefore, the mode is switched to the connected, four-wheel drive mode during vehicle deceleration from the disconnected, two-wheel drive mode, and the engagement of the dog clutch 8 is executed at this time. It is possible to obtain an effect to reduce the shock at the time of engagement described above by decreasing the synchronization speed when engaging the dog clutch 8.

6) In the clutch control device for a four-wheel drive vehicle of the first embodiment, the dog clutch 8 as the dog clutch is disposed in a position upstream of a bevel gear 9 and an output pinion 10, configuring a transfer mechanism, provided at a drive branch position to the left and right rear wheels 19 and 20, as the auxiliary drive wheels, and the electronically controlled coupling 16 as the friction clutch is disposed in the position of the left rear wheel drive shaft 17, which extends to the left rear wheel 19 as an auxiliary drive wheel, downstream of the bevel gear 9 and the output pinion 10, as the transfer mechanism, via the propeller shaft 12 and the rear differential 15. Accordingly, in a front wheel drive based four-wheel drive vehicle, when the disconnected, two-wheel drive mode is selected, it is possible to effectively suppress friction loss and oil stirring loss to achieve an improvement in fuel efficiency.

Second Embodiment

The clutch control device of the second embodiment is an example in which the clutch control device is applied to a rear wheel drive based four-wheel drive vehicle, and the positional relationship of the dog clutch and the friction clutch that sandwich the differential is reversed from the positional relationship thereof in the first embodiment.

Figure 10:
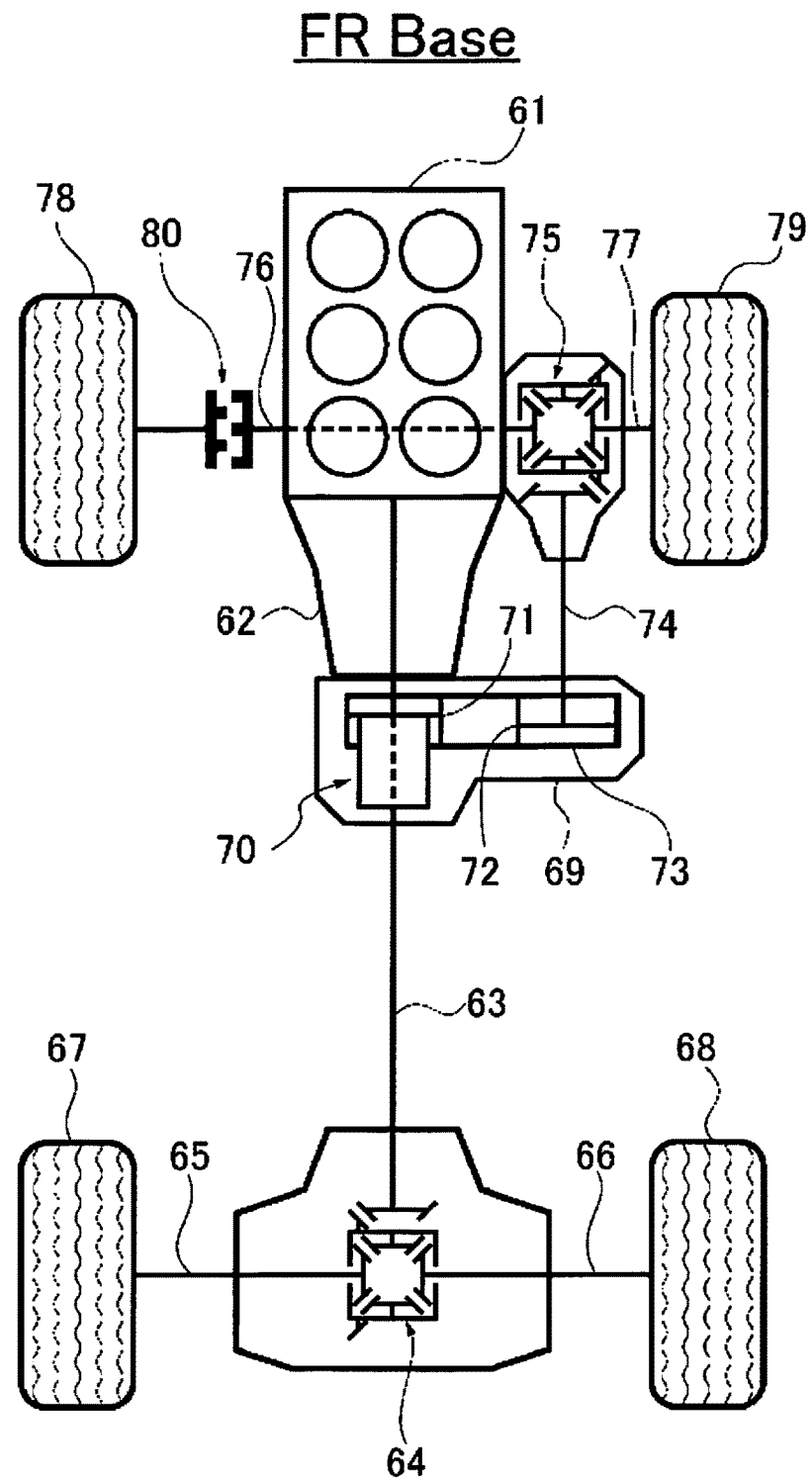
FIG. 10 is a block view of the drive system illustrating the configuration of the drive system of a rear wheel drive based four-wheel drive vehicle to which is applied the clutch control device of the second embodiment.

FIG. 10 illustrates the configuration of the drive system of a rear wheel drive based four-wheel drive vehicle to which is applied the clutch control device. The drive system configuration of the four-wheel drive vehicle will be described below based on FIG. 10.

The rear wheel drive system of the four-wheel drive vehicle is provided with a transverse engine 61 (drive source), a transmission 62, a rear propeller shaft 63, a rear differential 64, a left rear wheel drive shaft 65, a right rear wheel drive shaft 66, a left rear wheel 67 (main drive wheel), and a right rear wheel 68 (main drive wheel). That is, the drive force that has passed through the transverse engine 61 and the transmission 62 is transmitted to the left and right rear wheel drive shafts 65, 66 via the rear propeller shaft 63 and the rear differential 64, and constantly drives the left and right rear wheels 67 and 68 while allowing a differential rotation.

In the front wheel drive system of the four-wheel drive vehicle, a transfer mechanism is configured to comprise, inside a transfer case 69, an electronically controlled coupling 70 (friction clutch), an input side sprocket 71, an output side sprocket 72, and a chain 73. A front propeller shaft 74 that is connected to the output side sprocket 72, a front differential 75, a left front wheel drive shaft 76, a right front wheel drive shaft 77, a left front wheel 78 (auxiliary drive wheel), and a right front wheel 79 (auxiliary drive wheel) are provided. The electronically controlled coupling 70 is disposed inside the transfer case 69 in a position upstream of the input side sprocket 71 (main drive system side position).

A dog clutch 80 (dog clutch) is disposed in an intermediate position of the left front wheel drive shaft 76, which connects the front differential 75 and the left front wheel 78. That is, the drive system is configured to be capable of selecting a two-wheel drive mode (i.e., disconnected, two-wheel drive mode) in which both the electronically controlled coupling 70 and the dog clutch 80 are disengaged. The rotation of the drive system (rotation of the front propeller shaft 74, etc.) on the downstream side of the electronically controlled coupling 70 is stopped by releasing this electronically controlled coupling 70 and this dog clutch 80; it is thereby possible to suppress friction loss and oil stirring loss so that improved fuel efficiency can be realized.

Next, the difference between the first embodiment and the second embodiment will be described regarding the synchronous operation of the dog clutch 80. The first embodiment is configured so that the dog clutch 8 is disposed on the drive branch-side transmission system path and the electronically controlled coupling 16 is disposed on the auxiliary drive wheel-side transmission system path, which sandwich the rear differential 15, of the system for transmitting drive force to the left and right rear wheels 19 and 20, which are the auxiliary drive wheels. Accordingly, when there is a request to engage the dog clutch 8, which is in a disengaged state, and an engagement control of the electronically controlled coupling 16 is carried out, the left side gear of the rear differential 15 is restricted by the rotational frequency of the left rear wheel 19.

Therefore, of the rotational frequencies of the three rotating members of the rear differential 15 (the left and right side gears and the differential case), the rotational frequency of the propeller shaft 12, which is connected to the differential case, takes on the average rotational frequency of the left and right rear wheels 19 and 20 (driven wheel rotational frequency), since the rotational frequencies of the left and right side gears are restricted. As a result, when the left and right front wheels 6 and 7 are in a non-slip state, the differential rotation speed $\Delta N$ of the dog clutch 8 becomes $\Delta N=0$. However, when the left and right front wheels 6 and 7 are in a slip state, the differential rotation speed $\Delta N$ of the dog clutch 8, which has been decreasing with time, will reach a limit at a certain differential rotation; thereafter, the differential rotation speed $\Delta N$ of the dog clutch 8 shifts to an increase, and the differential rotation speed $\Delta N$ of the dog clutch 8 is increased with time.

In contrast, the second embodiment is configured so that the electronically controlled coupling 70 is disposed in the drive branch-side transmission system path and the dog clutch 80 is disposed in the auxiliary drive wheel-side transmission system path, which sandwich the front differential 75, of the system for transmitting drive force to the left and right front wheels 78, 79, which are the auxiliary drive wheels. Accordingly, when there is a request to engage the dog clutch 80, which is in a disengaged state, and an engagement control of the electronically controlled coupling 70 is carried out, the differential case of the front differential 75 is restricted by the rotational frequency of the rear propeller shaft 63.

Therefore, of the rotational frequencies of the three rotating members of the front differential 75 (left and right side gears and the differential case), due to the rotational frequency of the right side gear (right front wheel 79) being restricted, the rotational frequency of the left side gear will be determined by two rotational frequencies. As a result, when the left and right rear wheels 67 and 68 are in a non-slip state, the differential rotation speed $\Delta N$ of the dog clutch 80 becomes $\Delta N=0$. However, when the left and right rear wheels 67 and 68 are in a slip state, the differential rotation speed $\Delta N$ of the dog clutch 80 which has been decreasing with the passage of time will be reversed across $\Delta N=0$ (zero); thereafter, the differential rotation speed $\Delta N$ of the dog clutch 80 will be increased in a reversed state. The other actions are the same as the first embodiment, so that the descriptions thereof are omitted.

Next, the effects are described. The following effects can be obtained with the clutch control device for a four-wheel drive vehicle according to the second embodiment.

2-1) In the clutch control device for a four-wheel drive vehicle of the second embodiment, the electronically controlled coupling 70 as the friction clutch is disposed in a position upstream of a transfer mechanism (input side sprocket 71, output side sprocket 72, chain 73) provided at a drive branch position to the left and right front wheels 78, 79 as the auxiliary chive wheels, and the dog clutch 80 as the dog clutch is disposed in the left front wheel drive shaft 76 position of the left front wheel 78 as an auxiliary drive wheel, this drive shaft extending from the transfer mechanism to the propeller shaft and the front differential 75. Accordingly, in addition to the effects of 1)-5) described above, in a rear wheel drive based four-wheel drive vehicle, when the disconnected, two-wheel drive mode is selected, it is possible to effectively suppress friction loss and oil stirring loss, so as to achieve an improvement in fuel efficiency.

The clutch control device for a four-wheel drive vehicle of the present invention was described above based on the embodiments, but specific configurations thereof are not limited to these embodiments, and various modifications and additions to the design can be made without departing from the scope of the invention according to each claim in the Claims section.

In the first embodiment, an example was shown in which the clutch control device of the present invention is applied to a front wheel drive based four-wheel drive vehicle (4WD engine vehicle), in which an engine is mounted as the drive source. In the second embodiment, an example was shown in which the clutch control device of the present invention is applied to a rear wheel drive based four-wheel drive vehicle (4WD engine vehicle), in which the left and right rear wheels are the main drive wheels. However, the clutch control device may be applied to a rear wheel drive based four-wheel drive vehicle in which the positional relationship of the dog clutch and the friction clutch is set with the relationship as in the first embodiment. In addition, the clutch control device may be applied to a front wheel drive based four-wheel drive vehicle in which the positional relationship of the dog clutch and the friction clutch is set with the same relationship as in the second embodiment.

Figure 9:
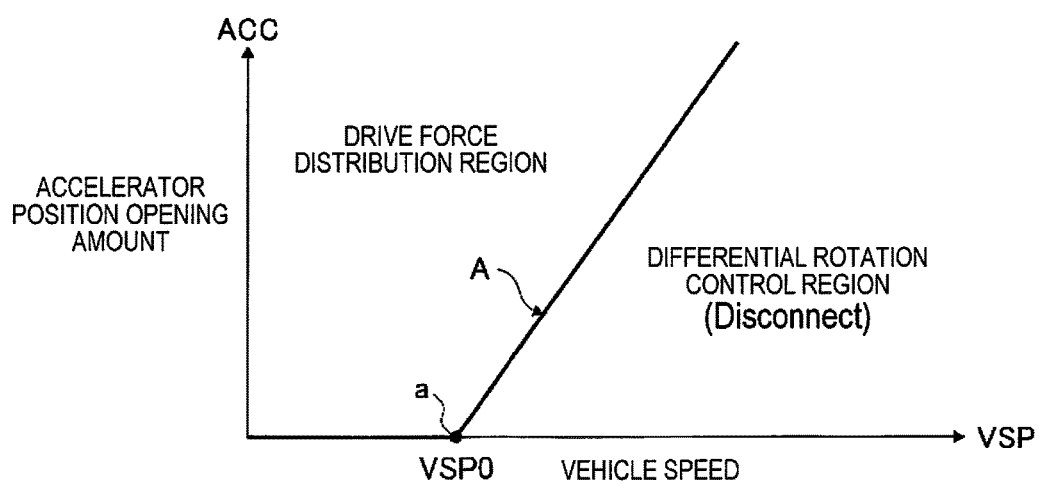
FIG. 9 is a basic map view illustrating another example of a drive mode switching map corresponding to the vehicle speed and the accelerator position opening amount used in the clutch control, when "auto mode" is selected.

Additionally, the clutch control device of the present invention can be applied to other vehicles besides a 4WD engine vehicle, such as a 4WD hybrid vehicle in which an engine and an electric motor are mounted as drive sources, or a 4WD electric vehicle in which an electric motor is mounted as the drive source. In addition, in the first embodiment, the two-wheel drive mode is separated into the disconnected, two-wheel drive mode and the standby, two-wheel drive mode; however, the two-wheel drive mode may be only the disconnected, two-wheel drive mode, as illustrated in FIG. 9, in order to further secure fuel efficiency. Additionally, in the embodiments, an example was shown in which the synchronization speed is variably set in accordance with the rate of deceleration, when reducing the synchronization speed during vehicle deceleration, but no limitation is imposed thereby; a constant rate of deceleration may be used as long as the synchronization speed is reduced more compared to when the vehicle is not decelerating. Furthermore, an example was shown in which the synchronization speed is set based on the rate of deceleration when crossing the region dividing line even when variably setting in accordance with the rate of deceleration, as shown in the embodiments, but no limitation is imposed thereby. For example, the rate of deceleration may be read every predetermined control cycle, and the synchronization speed may be changed constantly in accordance with the read rate of deceleration. In addition, other well-known friction clutches may be used as the friction clutch besides the multi-plate friction clutch shown in the embodiments, such as a single-plate friction clutch.

The invention claimed is:

1. A clutch control device for a four-wheel drive vehicle having a pair of main drive wheels and a pair of auxiliary drive wheels which are selectively connected to a drive source, the clutch control device comprising:
    a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch;
    a friction clutch operatively disposed in a transmission path between the main drive wheels and the auxiliary drive wheels to allocate a portion of the drive force from the drive source to the auxiliary drive wheels in accordance with a clutch engagement capacity of the friction clutch; and
    a clutch control unit operatively coupled to the dog clutch and the friction clutch to selectively carry out an engagement and disengagement control of the dog clutch and an engagement and disengagement control of the friction clutch in accordance with a vehicle state that is detected by a vehicle state detection device, and which can switch between a disconnected, two-wheel drive mode in which the two clutches are disengaged and a connected, four-wheel drive mode in which the dog clutch and the friction clutch are engaged, and
    the clutch control unit being programmed to include a synchronization speed control unit that reduces a synchronization speed of the dog clutch more during vehicle deceleration than when the vehicle is not decelerating at a time of transition from the disconnected, two- wheel drive mode to the connected, four-wheel drive mode.

2. The clutch control device as recited in claim 1, wherein the clutch control unit is further programmed to carry a synchronization of the dog clutch when transitioning from the disconnected, two-wheel drive mode to the connected, four-wheel drive mode by engagement of the friction clutch, and
the synchronization speed control unit is further programmed to execute a reduction of the synchronization speed by reducing an engagement speed of the friction clutch.

3. The clutch control device as recited in claim 1, wherein the synchronization speed control unit is further programmed to reduce the synchronization speed during deceleration when an accelerator position opening amount is zero.

4. The clutch control device as recited in claim 1, wherein the synchronization speed control unit is further programmed to reduce the synchronization speed more as a vehicle rate of deceleration is increased, when the synchronization speed is lowered.

5. The clutch control device as recited in claim 1, wherein the clutch control unit is further programmed to switch between the disconnected, two-wheel drive mode and the connected, four-wheel drive mode based on a mode switching map, in which the disconnected, two-wheel drive mode and the connected, four-wheel drive mode are set in accordance with an accelerator position opening amount and a vehicle speed, and
the clutch control unit is further programmed to set a control region to the connected, four-wheel drive mode in a lower speed region than to the disconnected, two-wheel drive mode.

6. The clutch control device as recited in claim 1, wherein the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

7. The clutch control device as recited in claim 1, wherein the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

8. The clutch control device according to claim 2, wherein the synchronization speed control unit is further programmed to reduce the synchronization speed during deceleration when an accelerator position opening amount is zero.

9. The clutch control device according to claim 2, wherein the synchronization speed control unit is further programmed to reduce the synchronization speed more as a vehicle rate of deceleration is increased, when the synchronization speed is lowered.

10. The clutch control device according to claim 3, wherein
the synchronization speed control unit is further programmed to reduce the synchronization speed more as a vehicle rate of deceleration is increased, when the synchronization speed is lowered.

11. The clutch control device according to claim 2, wherein
the clutch control unit is further programmed to switch between the disconnected, two-wheel drive mode and the connected, four-wheel drive mode based on a mode switching map, in which the disconnected, two-wheel drive mode and the connected, four-wheel drive mode are set in accordance with an accelerator position opening amount and a vehicle speed, and
the clutch control unit is further programmed to set a control region to the connected, four-wheel drive mode in a lower speed region than to the disconnected, two-wheel drive mode.

12. The clutch control device according to claim 3, wherein
the clutch control unit is further programmed to switch between the disconnected, two-wheel drive mode and the connected, four-wheel drive mode based on a mode switching map, in which the disconnected, two-wheel drive mode and the connected, four-wheel drive mode are set in accordance with the accelerator position opening amount and a vehicle speed, and
the clutch control unit is further programmed to set a control region to the connected, four-wheel drive mode in a lower speed region than to the disconnected, two-wheel drive mode.

13. The clutch control device according to claim 4, wherein
the clutch control unit is further programmed to switch between the disconnected, two-wheel drive mode and the connected, four-wheel drive mode based on a mode switching map, in which the disconnected, two-wheel drive mode and the connected, four-wheel drive mode are set in accordance with an accelerator position opening amount and a vehicle speed, and
the clutch control unit is further programmed to set a control region to the connected, four-wheel drive mode in a lower speed region than to the disconnected, two-wheel drive mode.

14. The clutch control device according to claim 2, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

15. The clutch control device according to claim 3, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

16. The clutch control device according to claim 4, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

17. The clutch control device according to claim 2, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

18. The clutch control device according to claim 3, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

19. The clutch control device according to claim 4, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

* * * * *